UNITED STATES PATENT OFFICE.

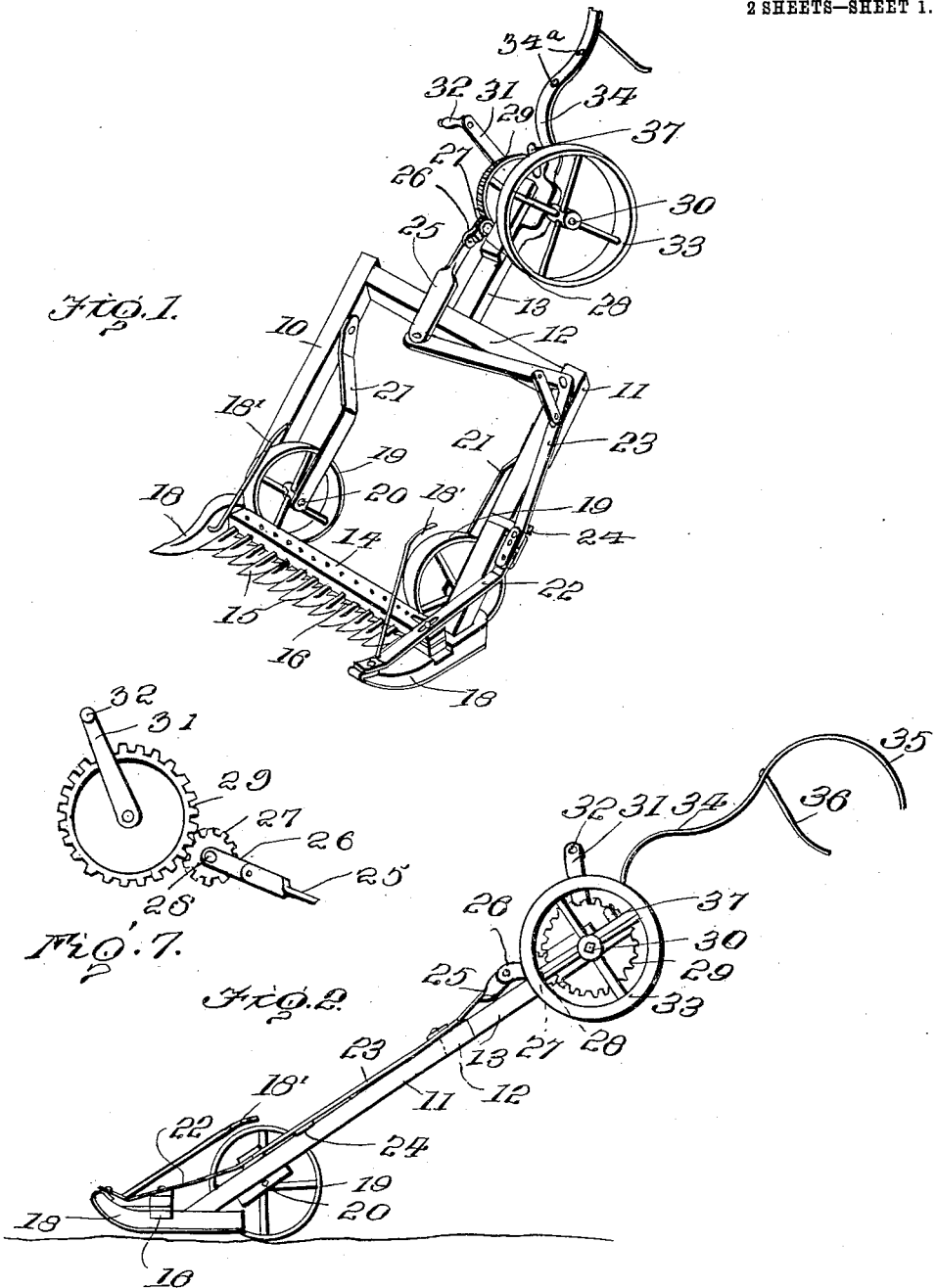

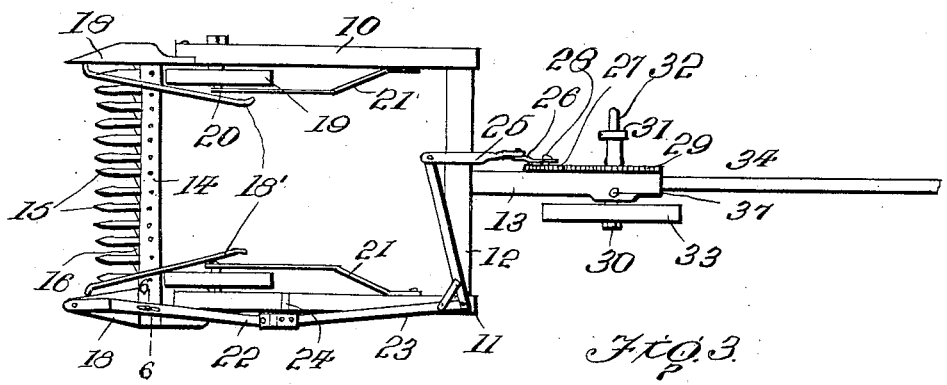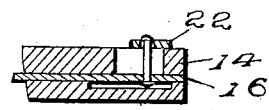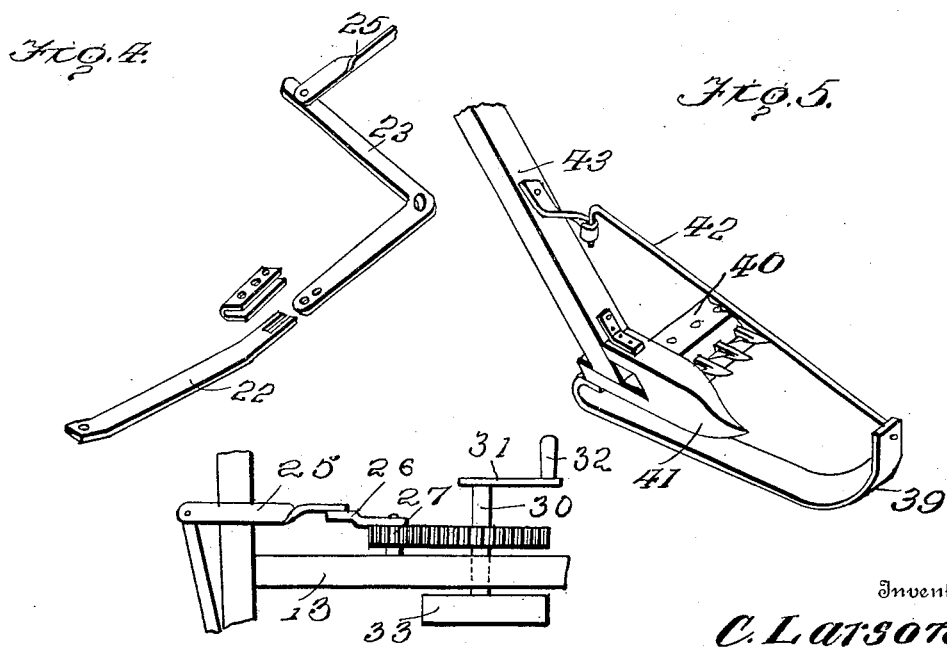

CONRAD LARSON, OF GRANTSBURG, WISCONSIN.

MOWER.

948,333.  Specification of Letters Patent.  Patented Feb. 8, 1910.

Application filed May 12, 1909. Serial No. 495,403.

*To all whom it may concern:*

Be it known that I, CONRAD LARSON, citizen of the United States, residing at Grantsburg, in the county of Burnett and State of Wisconsin, have invented certain new and useful Improvements in Mowers, of which the following is a specification.

This invention relates to mowers and refers particularly to a hand actuated mower.

The invention has for an object the provision of a mower wherein a great leverage is obtained in the reciprocation of the cutter bar so that the mower may be used advantageously in heavy grass and may be operated by the exertion of comparatively little work on the operative parts of the same.

The invention has for another object the provision of a novel arrangement of a shoulder brace for supporting the mower in a correct position and a novel means for adjusting the same to the shoulder of the operator so as to accommodate various persons who manipulate the machine.

The invention more specifically has as an object the provision of a lever which is so fulcrumed as to dispose the power upon the extremity of the long arm while the work which is to be performed by the lever is attached intermediately thereof, the fulcrum of the same being positioned at the opposite extremity of the lever. With this arrangement a great leverage is obtained with the expenditure of slight energy in reciprocating the long arm of the lever and the cutter-bar is thereby caused to reciprocate and to cut heavy marsh grass or the like.

The invention still further contemplates the provision of runners in conjunction with the mower whereby the same may be employed in marsh or rough land and may be successfully operated by the walking of the operator.

For a full understanding of the invention reference is to be had to the following description and accompanying drawings, in which:—

Figure 1 is a perspective view of the complete machine. Fig. 2 is a side elevation of the same. Fig. 3 is a top plan view of the machine. Fig. 4 is a detailed perspective view of the bell-crank lever and connection of the same to the operating arm, and Fig. 5 is a detailed perspective view of a modified form of the device disclosing a runner as applied to the same. Fig. 6 is a section on the line 6—6 of Fig. 3. Fig. 7 is a detailed side elevation of the operating mechanism and pitman connected with the same. Fig. 8 is a top plan view of the same.

Corresponding and like parts are referred to in the following description and indicated in all the views of the drawings by the same reference characters.

Referring to the drawings, the frame of the device comprises two side-bars 10 and 11 which are disposed in parallel relation and secured at their rear ends by means of a cross-brace 12 which carries the tongue 13 of the mower. The lower extremities of the side-bars 10 and 11 are provided with a transverse cutter-bar 14 which is provided with a plurality of forwardly projected guards 15 and upon which reciprocates a cutter-blade 16. The end guards 18 are provided with deflectors 18′ which comprise spring rods which are extended upwardly and backwardly over the wheels 19 which are mounted against the inner faces of the side-bars 10 and 11 upon stub-shafts 20 which are braced in position by means of strips 21 which are extended from the upper ends of the side-bars 10 and 11 about the wheels 19 and engaged with the inner extremities of the stub-shafts 20.

For the purpose of reciprocating the cutter-blade 16 one of the end guards 18 is provided with an arm 22 which is pivotally mounted upon the outer end of the same and extended backwardly where it is engaged at its rear extremity pivotally with one arm of a bell-crank lever 23 which is fulcrumed upon the rear adjacent corner of the frame of the mower. The longitudinal arm of the bell-crank lever 23, which is pivotally connected to the arm 22, is supported upon a guide 24 to prevent the engagement of the same with the side-bar 11 thereby lessening the friction of the operation of the machine. The transverse arm of the bell-crank lever 23 extends inwardly along the cross-brace 12 and is pivotally secured to a pitman 25 which is connected at its rear extremity upon a crank arm 26 outwardly extended from the pinion 27 which is mounted upon a stub-shaft 28 carried through the tongue 13. The pinion 27 is disposed at one side of the tongue 13 and is meshed with a gear-wheel 29 which is rigidly mounted upon a shaft 30 which is engaged through the tongue 13 rearwardly of the stub-shaft 28 and which is provided with a crank-arm 31 which carries a handle 32 by means of which the operator may be enabled to rotate the gear 29. The opposite extremity of the shaft 30 is provided with a balance wheel 33 which maintains the uniform rotation of the gear wheel 29 should the cutter-blade 16 meet with articles or stumps which would cause the stopping of the operation of the device. The tongue 13 is provided with a metallic strip 34 which extends rearwardly and is curved upwardly therefrom and which is provided with a hook 35 upon its rear extremity for engagement over the shoulder of the operator, the hook 35 being retained in position by the employment of a tongue 36 which is adjustably engaged in the apertures 34$^a$ and which is projected downwardly from the intermediate point of the strip 34 and is adapted for engagement against the forward side of the shoulder to enable the operator to push the machine during employment of the same while running. The tongue 13 is provided with an upwardly extended handle 37 which is engaged by the operator's left hand to steady the device and to enable the operator to exert force upon the crank arm 31 when it is desired to do so. The cutter-blade 16 is pivotally secured to an intermediate portion of the arm 22 so that the same will be transversely reciprocated during the vibration of the arm 22 under the action of the bell-crank lever 23, the pivotal connection between the cutter-blade 16 and the arm 22 being had through the medium of a projection 38 upwardly extended from the cutter-blade 16.

In the drawings is disclosed a modification of this device which comprises a pair of runners 39 which are formed of strips of spring metal which are secured beneath the opposite ends of the cutter-bar 40, the runners being curved rearwardly and downwardly to engage the ground when they are carried forwardly and projected beyond the end guards 41 and are supported in such position by the employment of brace rods 42 which are extended backwardly to a point adjacent the side-bars 43 of the frame and engage with the forward extremities of the runners 39. These runners are preferably employed when the machine is used in marsh or rough land and are adapted to maintain the cutter-bar in a substantially horizontal position in the operation of the device and are adapted to enable the manipulation of the machine more easy since the runners will tend to raise the machine out of depressions in the ground when the same is carried thereover.

In operation the device is manipulated as follows: The operator engages the shoulder beneath the hook 35 and adjusts the tongue 36 into one of the apertures formed through the strip 34 to engage against the forward side of the shoulder and to fit snugly thereagainst. The left hand is now positioned upon the handle 37 and the handle 32 is grasped by the right hand. The operator now walks forwardly and thus pushes the device as the same is supported upon the wheels 19. When the grass is encountered the handle 32 is rotated which causes the actuation of the gear 29 to impart rotation to the pinion 27 and thus reciprocate the pitman 25. As the pitman 25 is reciprocated the bell-crank lever 23 is vibrated and thereby causes the movement of the arm 22 to reciprocate the cutter-blade 16 and to cause the same to engage the grass which is disposed between the blades of the cutter-bar 14 and to thereby cut the same.

It is readily observed that when the gear-wheel 29 is rotated at a moderate rate of speed the balance wheel 33 maintains such speed upon the engagement of heavy blades of grass or other foreign matter within the guards 15 as to thereby cause the cutting of the same without stopping the operation of the mechanism.

The wheels 19 are employed when the device is utilized for cutting the grass upon lawns or smooth fields, but when the mower is used for cutting marsh grass or heavy lowland grass the runners 39 are preferably employed since they maintain the frame in a steady position during the operation of the same.

Having thus described the invention what is claimed as new is:—

1. A mower as specified comprising a frame, a cutter-blade disposed on said frame, an arm fulcrumed at its forward end to the forward end of said frame and intermediately pivoted to said cutter-blade, a bell-crank lever mounted on said frame and pivotally engaged at one end to the rear extremity of said arm, and means carried by said frame for vibrating the opposite extremity of said bell-crank lever.

2. A mower as specified comprising a frame, a cutter-bar mounted on said frame, guards disposed on said cutter-bar, end guards forwardly extended from said cutter-bar, a cutter-blade disposed on said cutter-bar, an arm pivotally mounted at its forward extremity to the outer end of one of said end guards, said arm being intermediately pivoted to one extremity of said cutter-blade, a bell-crank lever fulcrumed on said frame and connected at one end to the rear extremity of said arm, a pinion mounted on said frame, a pitman disposed between the opposite end of said bell-crank lever and said pinion, a gear mounted on said frame and meshed with said pinion to rotate the same, a shaft for supporting said gear carried by said frame, a balance wheel disposed on said shaft and a crank-arm carried by said shaft for rotating said gear.

3. A mower as specified comprising a frame, wheels carried by said frame to support the same, a cutter-bar transversely disposed across the forward end of said frame, a cutter-blade disposed on said cutter-bar, an arm carried by said frame and intermediately pivoted to one end of said cutter-blade, the forward extremity of said arm being fulcrumed to said frame, a bell-crank lever pivoted to said frame to the rearward of said arm and connected to the rear extremity of said arm, a pitman connected to the opposite end of said bell-crank lever, gears carried by said frame for reciprocating said pitman, a strip rearwardly and upwardly extended from said frame for engagement with the shoulder of the operator and an adjustable tongue carried by said strip for adjustment to the shoulder of the operator.

4. A mower as specified comprising a frame, a cutter-blade carried on said frame, an arm carried by said frame and intermediately connected to said cutter-blade, one extremity of said arm being fulcrumed to said frame, a bell-crank lever carried by said frame and connected at one end to the opposite end of said arm, means for reciprocating said bell-crank lever, a metallic spring strip rearwardly and upwardly extended from said frame, a hook formed upon the rear end of said strip for engagement about the shoulder of an operator and a tongue adjustably secured to said strip forwardly of said hook for engagement against the opposite side of the shoulder of the operator.

In testimony whereof I affix my signature in presence of two witnesses.

CONRAD LARSON. [L. S.]

Witnesses:
  AND A. ANDERSON,
  ANNA WILD.